(12) United States Patent
Tank

(10) Patent No.: US 6,182,533 B1
(45) Date of Patent: Feb. 6, 2001

(54) METHOD OF MAKING A DRILL BLANK

(76) Inventor: Klaus Tank, 9 Warbleton Avenue Essexwold, Johannesburg (ZA)

( * ) Notice: Under 35 U.S.C. 154(b), the term of this patent shall be extended for 0 days.

(21) Appl. No.: 09/140,534

(22) Filed: Aug. 26, 1998

(30) Foreign Application Priority Data

Aug. 27, 1997 (ZA) .................................................. 97/7707
Jan. 26, 1998 (ZA) .................................................. 98/0608

(51) Int. Cl.$^7$ .............................. B23D 5/02; B23P 15/32
(52) U.S. Cl. ................ 76/108.1; 76/101.1; 76/DIG. 12; 408/145
(58) Field of Search ............................ 76/101.1, 108.1, 76/108.2, DIG. 11, DIG. 12; 408/145, 144, 229, 227; 407/118, 119; 428/33, 408; 419/49, 18, 5, 8; 427/585

(56) References Cited

U.S. PATENT DOCUMENTS

| | | | | |
|---|---|---|---|---|
| 4,629,373 | * | 12/1986 | Hall | 407/118 |
| 4,694,710 | * | 9/1987 | Phaal | 76/108.1 |
| 4,724,728 | * | 2/1988 | Phaal | 76/108.1 |
| 4,748,088 | * | 5/1988 | Billgren | 428/558 |
| 4,972,637 | * | 11/1990 | Dyer | 76/101.1 X |
| 5,299,471 | * | 4/1994 | Tank et al. | 76/108.1 |
| 6,029,544 | * | 2/2000 | Katayama | 76/108.6 |

FOREIGN PATENT DOCUMENTS

| | | | |
|---|---|---|---|
| 0 132 652 | 2/1985 | (EP) . | |
| 0 206 652 | 12/1986 | (EP) . | |
| 0 223 474 | 5/1987 | (EP) . | |
| 0251130 | * 10/1988 | (JP) | 76/108.1 |

* cited by examiner

Primary Examiner—Rinaldi I. Rada
Assistant Examiner—Boyer Ashley
(74) Attorney, Agent, or Firm—Oblon, Spivak, McClelland, Maier & Neustadt, P.C.

(57) ABSTRACT

A method of making a drill blank which is elongate and which has a vein of a bonding material located in an end surface thereof. A recess is formed in a surface of a cemented carbide body. Either a layer of ultra-hard abrasive or a mass of ultra-hard abrasive particles is then placed on a surface of the recess. A cemented carbide piece, having the same shape and cross-sectional size as the recess, is inserted into the recess. The cemented carbide body is subjected to conditions of elevated temperature and pressure so that either the abrasive compact layer or the layer of the ultra-hard abrasive bonds the cemented carbide piece to the cemented carbide body. Finally, the cemented carbide body is severed through either the abrasive compact layer or layer of ultra-hard abrasive to produce one or more drill blanks.

36 Claims, 3 Drawing Sheets

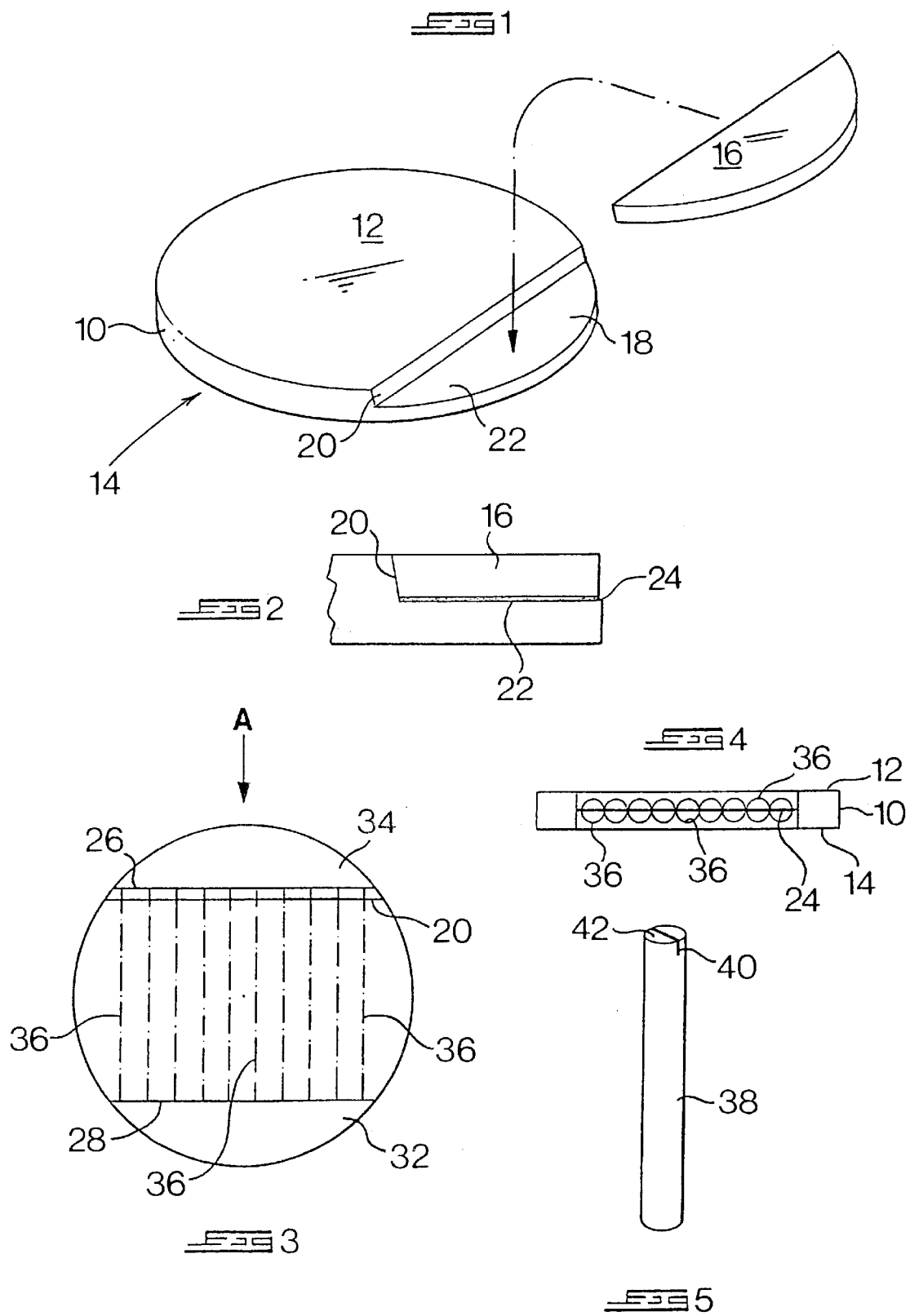

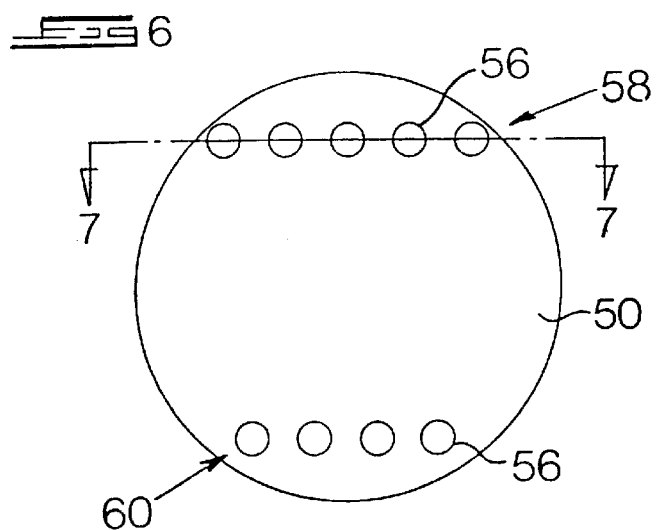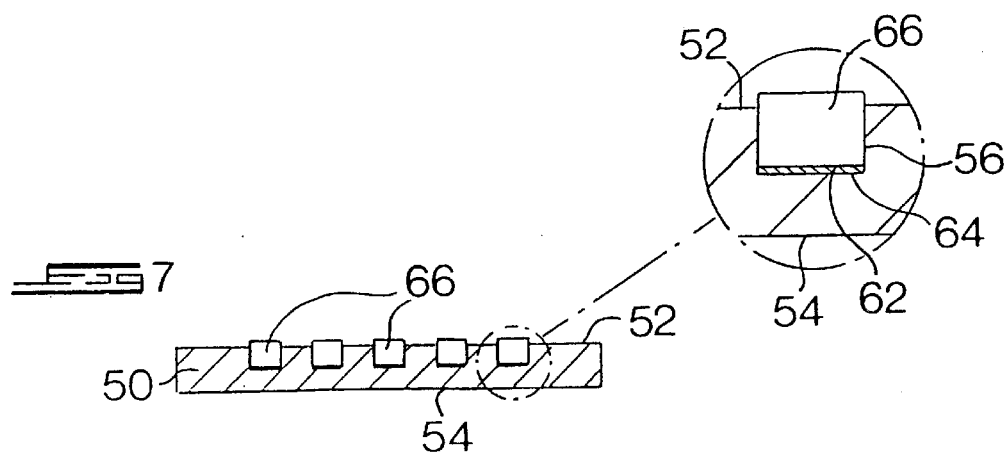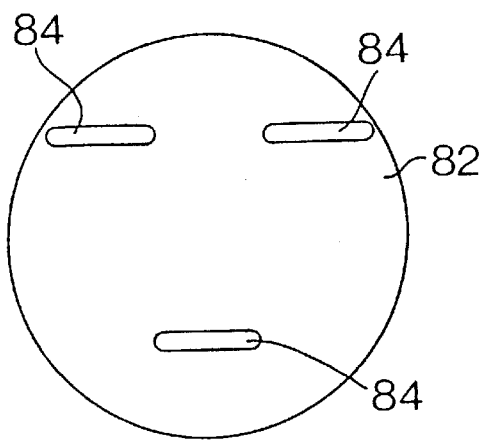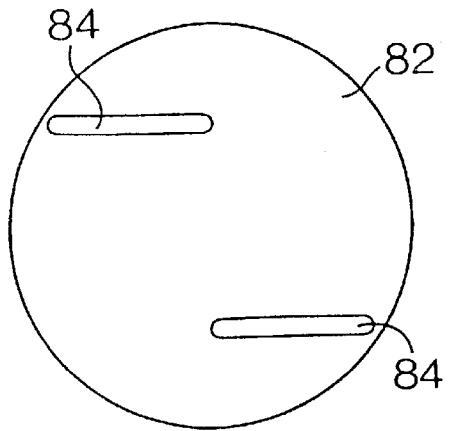

METHOD OF MAKING A DRILL BLANK

BACKGROUND OF THE INVENTION

This invention relates to a method of making a drill blank and more particularly a micro-drill blank.

In the manufacture of various products, particularly printed circuit boards, it is necessary to form a plurality of small holes therein. These holes are generally formed by means of a small diameter twist drill or micro-drill. Since such boards are abrasive, for example made of fibre reinforced plastic, it has been found that drill bits tipped with diamond abrasive compact are particularly suitable.

Various methods have been described in the literature for producing micro drills. EP 0 206 652 describes a method of producing a blank for a drill bit comprising providing a composite abrasive compact having a diamond or cubic boron nitride compact bonded to a cemented carbide backing and having major surfaces on each of opposite sides thereof, severing the composite abrasive compact along planes perpendicular to the flat surfaces and from one flat surface to the other to produce a plurality of sticks polygonally-shaped end-on, each severed plane defining side surfaces of adjacent sticks and longitudinally rounding each stick to produce from it a blank for a drill bit which is round end-on. The drills may be made by fluting the rounded stick.

EP 0 223 474 describes a method of making a drill blank comprising a cylindrical carbide body having a vein of abrasive compact embedded in a groove at one end thereof and bonded to the carbide. The method includes the steps of providing a solid, cylindrical body of cemented carbide having end surfaces joined by a side surface, forming a series of grooves in one end surface, placing compact-forming material in the grooves, exposing the cylindrical body to temperature and pressure conditions suitable to produce an abrasive compact of the material in the grooves and severing the cylindrical body longitudinally from one end surface to the opposite end surface to produce a plurality of drill blanks. The drills are again produced from such blanks by fluting.

Other methods of making micro drill bits are known. Some of these methods, e.g. that described in EP 0 132 652, involve various bonding steps which again adds to the cost. The bonded regions also introduce a potential zone of weakness.

SUMMARY OF THE INVENTION

According to the present invention, a method of making a drill blank, particularly a blank for a micro drill, includes the steps of:

(i) providing a cemented carbide body having a recess formed in a surface thereof, (ii) placing a layer of ultra-hard abrasive or a mass of ultra-hard abrasive particles on a surface of the recess, (iii) inserting a cemented carbide piece having the same shape and cross-sectional size as the recess, into the recess, (iv) subjecting the cemented carbide body to conditions of elevated temperature and pressure suitable to form an abrasive compact of the abrasive particles, when used, and bond such compact or the layer of ultra-hard abrasive to the carbide, and (v) severing the cemented carbide body through the abrasive compact layer or layer of ultra-hard abrasive to produce one or more drill blanks.

Severing of the cemented carbide body in step (v) takes place in such a manner that the abrasive compact layer, or layer of ultra-hard abrasive, in each drill blank, defines a vein generally located in an end surface of the blank. Each drill blank will generally be elongate in shape and may have a circular, rectangular, square, elliptical or hexagonal or other cross-section.

The cemented carbide body will generally have a surface in which the recess is formed and an opposite surface and severing in step (v) will generally include severing from the one surface to the other surface along first spaced lines, one of which passes through the abrasive layer, and along spaced parallel lines between first spaced lines. The first spaced lines will generally be parallel. Further, the spaced parallel lines will generally be at right angles to the first spaced lines.

The recess may take the form of a cut-out at an edge surface of the cemented carbide body. When the edge surface is a curved surface, the recess may be formed by cutting a segment from that surface.

The cemented carbide body may be disc or elliptical in shape. Other shapes of cemented carbide bodies may also be used in the practice of the invention.

A plurality of recesses may be formed, at least some of which are wholly within the periphery, i.e. the outer peripheral surface, of the cemented carbide body. These recesses may be provided as two spaced banks of recesses. The recesses in one bank are preferably staggered relative to those in the other bank. In this case, severing in step (v) preferably includes severing along a first line passing through the recesses in one bank, along a second line passing through the recesses in the other bank, and along spaced parallel lines between the first and second lines.

At least some of the plurality of recesses may be circular or elongate in plan. When the recesses are elongate in plan, they may be essentially elliptical.

The layer of ultra-hard abrasive may be a layer of diamond produced by chemical vapour deposition. The mass of ultra-hard abrasive particles will generally be a mass of diamond or cubic boron nitride particles, with or without binder, and is suitable to produce an abrasive compact when subjected to elevated temperature and pressure. The conditions of abrasive compact manufacture are well known in the art. Diamond abrasive compacts are also known as PCD, and cubic boron nitride compacts also known as PCBN.

BRIEF DESCRIPTION OF THE DRAWINGS

FIG. 1 is a perspective view of a cemented carbide body suitable for use in the method of the invention;

FIG. 2 is a side view of a portion of FIG. 1,

FIG. 3 is a plan view of FIG. 1 showing the manner in which the cemented carbide body may be severed, FIG. 4 is a view in the direction of arrow A of FIG. 3, FIG. 5 is a perspective view of a drill blank produced by an embodiment of the invention, FIG. 6 is a plan view of a second embodiment of a cemented carbide body suitable for use in the method of the invention, FIG. 7 is a section along the line 7—7 of FIG. 6, FIG. 11 is a plan view of a third embodiment of a cemented carbide body suitable for use in the method of the invention, and FIG. 12 is a plan view of a fourth embodiment of a cemented carbide body suitable for use in the method of the invention.

DESCRIPTION OF AN EMBODIMENTS

Figure 8:
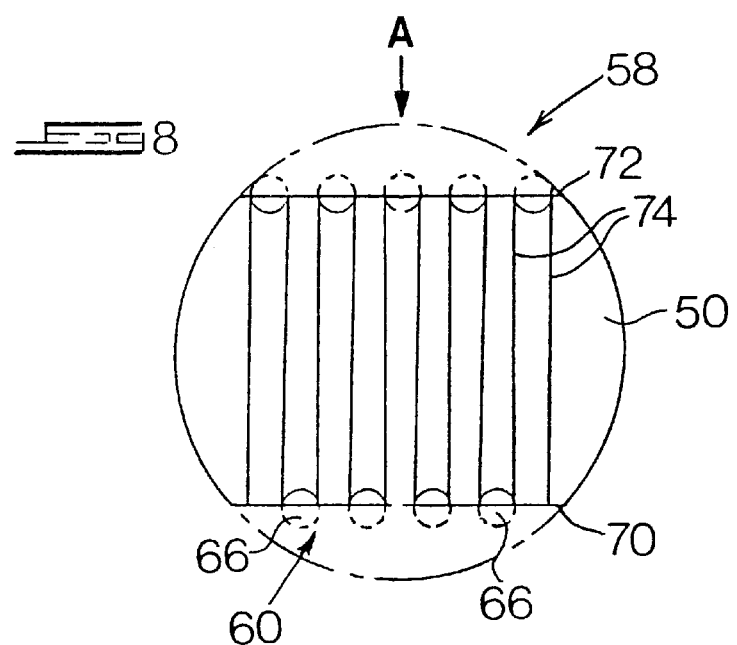
FIG. 8 is a plan view of FIG. 6 showing the manner in which the cemented carbide body may be severed.

A first embodiment of the invention will now be described with reference to FIGS. 1 to 5 of the accompanying drawings. Referring to these drawings, FIG. 1 shows a disc-shaped cemented carbide body 10 having top and bottom flat surfaces 12, 14 and a segment 16 cut out from an edge of the body. The cut-out segment 16 leaves a recess 18 defined by surfaces 20, 22 in the cemented carbide body 10.

A layer 24 of diamond particles is placed on the surface 22. Thereafter, the segment 16 is placed in the recess 18, as shown by FIG. 2. It will be noted from this figure that the surface 20 is at an obtuse angle to the surface 22. This ensures that the segment 16 fits snugly back into the recess.

The cemented carbide body is thereafter placed in a reaction capsule which itself is placed in the reaction zone of a conventional high temperature/high pressure apparatus. The contents of the capsule are subjected to diamond synthesis conditions which are typically a pressure of 50 to 70 kilobars (5 to 7 GPa) and a temperature of 1400 to 1600° C. The conditions are maintained for a period suitable to produce a diamond abrasive compact of the layer 24 and bond this layer to the carbide body 10 and segment 16. Typically, this period is 10 to 15 minutes. The cemented carbide body, after sintering, may be recovered from the reaction capsule using known methods.

A plurality of micro-drill blanks may now be produced from the sintered cemented carbide body in the manner shown by FIGS. 3 and 4. The cemented carbide body is first severed from one flat surface 12 to the opposite flat surface 14 along parallel lines 26, 28 and the cut-off pieces 32, 34 removed. Thereafter, a plurality of drill blanks are produced by severing the cemented carbide body 10 in the manner shown by parallel lines 36 in FIGS. 3 and 4.

The micro-drill blanks thus produced are illustrated by FIG. 5. Referring to this figure, the micro-drill blank comprises an elongate cylindrical stick 38 having a vein of diamond abrasive compact 40 formed in end 42.

A second embodiment of the invention will now be described with reference to FIGS. 6 to 10. Referring to these drawings, FIGS. 6 and 7 show a disc-shaped cemented carbide body 50 having top and bottom flat surfaces 52, 54. Two banks of circular recesses 56 are produced in the body 50. The recesses extend from flat surface 52 into the body 50, but do not extend all the way through the body to the other surface 54. The recesses 56 in one bank 58 are staggered relative to the recesses 56 in the opposite bank 60.

A layer 62 of diamond particles is placed on the base surface 64 of each recess. Thereafter, a disc-shaped insert 66, having a shape and cross-sectional size the same as the recess, is inserted into each recess, as shown by FIG. 7. It will be noted from FIG. 7 that the insert extends beyond the surface 52 the thickness of the layer 62.

The cemented carbide body is thereafter placed in a reaction capsule which itself is placed in the reaction zone of a conventional high temperature/high pressure apparatus. The contents of the capsule are subjected to diamond synthesis conditions which are typically a pressure of 50 to 70 kilobars (5 to 7 GPa) and a temperature of 1400 to 1600° C. The conditions are maintained for a period suitable to produce a diamond abrasive compact of the layer 62 and bond this layer to the carbide body 50 and insert 66. Typically, this period is 10 to 15 minutes. The cemented carbide body, after sintering, may be recovered from the reaction capsule using known methods.

Figure 9:
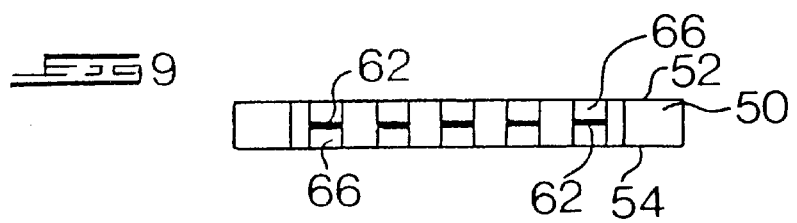
FIG. 9 is a view in the direction of arrow A of FIG. 8.

A plurality of micro-drill blanks may now be produced from the sintered cemented carbide body in the manner shown by FIGS. 8 and 9. The cemented carbide body 50 is first severed from surface 52 to surface 54 along parallel lines 70, 72 through the banks 58, 60, respectively. Thereafter, a plurality of drill blanks are produced by severing the cemented carbide body 50 in the manner shown by the parallel lines 74 in FIGS. 8 and 9.

Figure 10:
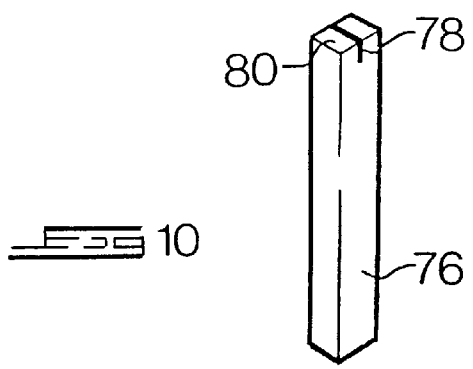
FIG. 10 is a perspective view of a drill blank produced by an embodiment of the invention.

The micro-drill blanks thus produced are illustrated by FIG. 10. Referring to this figure, the micro-drill blank comprises an elongate cylindrical stick 76 having a vein of diamond abrasive compact 78 formed in an end 80 thereof.

FIGS. 11 and 12 show further embodiments of cemented carbide bodies suitable for use in the method of the invention. Referring to these drawings, the cemented carbide body 82 is the same as the cemented carbide body 50. In these embodiments, elongate recesses 84 are provided. These recesses are filled with abrasive particles and inserts in the same manner as that described for the embodiment of FIGS. 6 to 10. After sintering, the bodies may be severed in a similar manner to that of the embodiment of FIGS. 6 to 10 to produce a plurality of drill blanks.

The drill blanks of FIGS. 5 and 10 can, of course, have other cross-sections, e.g. hexagonal.

What is claimed is:

1. A method of making a drill blank, said method comprising the steps of:
   (i) providing a cemented carbide body having a recess formed in a surface thereof, wherein said recess has a shape and a cross-sectional size;
   (ii) placing a layer of ultra-hard abrasive on a surface of said recess;
   (iii) inserting a cemented carbide piece into said recess, said cemented carbide piece having a shape and a cross-sectional size approximately equal to said shape and said cross-sectional size of said recess;
   (iv) subjecting said cemented carbide body to conditions of elevated temperature and pressure such that said layer of said ultra-hard abrasive is bonded to said cemented carbide body; and
   (v) severing said cemented carbide body through said layer of said ultra-hard abrasive to produce at least one drill blank.

2. The method according to claim 1, wherein said severing of said cemented carbide body takes place in such a manner that said layer of said ultra-hard abrasive, in each drill blank of said at least one drill bank, defines a vein located in an end surface of each drill blank of said at least one drill blank.

3. The method according to claim 1, wherein said cemented carbide body is disc-shaped.

4. The method according to claim 1, wherein said at least one drill blank is elongate in shape having a vein of said ultra-hard abrasive located in an end surface thereof.

5. The method according to claim 1, wherein said at least one drill blank has a cross-section that is any one of circular, rectangular and square.

6. The method according to claim 1, wherein said layer of said ultra-hard abrasive is a layer of diamond produced by chemical vapor deposition.

7. The method according to claim 1, wherein said recess forms a cut-out at an edge surface of said cemented carbide body.

8. The method according to claim 7, wherein said edge surface is a curved surface and said recess is formed by cutting a segment from said curved surface.

9. The method according to claim 1, wherein said cemented carbide body has a first surface, in which said recess is formed, and a second surface, which is opposite to said first surface, and said severing of said cemented carbide body includes severing from said first surface to said second surface along first spaced lines, one first spaced line of said first spaced lines passes through said layer of said ultra-hard abrasive, and along spaced parallel lines located between said first spaced lines.

10. The method according to claim 9, wherein said first spaced lines are parallel.

11. The method according to claim 10, wherein said spaced parallel lines are at right angles to said first spaced lines.

12. The method according to claim 1, wherein a plurality of recesses are formed, at least some of which are wholly within an outer periphery of said cemented carbide body.

13. The method according to claim 12, wherein at least some of said plurality of recesses are circular in plan view.

14. The method according to claim 13, wherein at least some of said plurality of recesses are elongate in plan view to form elongate recesses.

15. The method according to claim 14, wherein said elongate recesses are essentially elliptical in plan view.

16. The method according to claim 13, wherein first and second spaced banks of recesses are formed.

17. The method according to claim 9, wherein recesses in said first spaced bank are staggered relative to recesses in said second spaced bank.

18. The method according to claim 17, wherein said severing said cemented carbide body includes severing along a first line passing through said recesses in said first spaced bank, along a second line passing through said recesses in said second spaced bank, and along spaced parallel lines between said first and second lines.

19. A method of making a drill blank, said method comprising the steps of
  (i) providing a cemented carbide body having a recess formed in a surface thereof, wherein said recess has a shape and a cross-sectional size;
  (ii) placing a mass of ultra-hard abrasive particles on a surface of said recess;
  (iii) inserting a cemented carbide piece into said recess, said cemented carbide piece having a shape and a cross-sectional size approximately equal to said shape and said cross-sectional size of said recess;
  (iv) subjecting said cemented carbide body to conditions of elevated temperature and pressure such that an abrasive compact is formed and is bonded to said cemented carbide body; and
  (v) severing said cemented carbide body through said abrasive compact to produce at least one drill blank.

20. The method according to claim 19, wherein said severing of said cemented carbide body takes place in such a manner that said abrasive compact, in each drill blank of said at least one drill blank, defines a vein located in an end surface of each drill blank of said at least one drill blank.

21. The method according to claim 20, wherein said cemented carbide body is disc-shaped.

22. The method according to claim 20, wherein said at least one drill blank are elongate in shape having a vein of said abrasive compact located in an end surface thereof.

23. The method according to claim 20, wherein said at least one drill blank has a cross-section that is any one of circular, rectangular, and square.

24. The method according to claim 20, wherein said mass of ultra-hard abrasive particles is selected from a group consisting of diamond and cubic boron nitride compacts, any one of with and without binder, and suitable to produce said abrasive compact when said subjecting said carbide body to said condition of said elevated temperature and pressure is performed.

25. The method according to claim 20, wherein said recess forms a cut-out at an edge surface of said cemented carbide body.

26. The method according to claim 25, wherein said edge surface is a curved surface and said recess is formed by cutting a segment from said curved surface.

27. The method according to claim 20, wherein said cemented carbide body has a first surface, in which said recess is formed, and a second surface, which is opposite to said first surface, and said severing of said cemented carbide body includes severing from said first surface to said second surface along first spaced lines, one first spaced line of said first spaced lines passes through said abrasive compact, and along spaced parallel lines located between said first spaced lines.

28. The method according to claim 27, wherein said first spaced lines are parallel.

29. The method according to claim 28, wherein said spaced parallel lines are at right angles to said first spaced lines.

30. The method according to claim 20, wherein a plurality of recesses are formed, at least some of which are wholly within an outer periphery of said cemented carbide body.

31. The method according to claim 30, wherein at least some of said plurality of recesses are circular in plan view.

32. The method according to claim 31, wherein at least some of said plurality of recesses are elongate in plan view to form elongate recesses.

33. The method according to claim 29, wherein said elongate recesses are essentially elliptical in plan view.

34. The method according to claim 31, wherein first and second spaced banks of recesses are formed.

35. The method according to claim 27, wherein recesses in said first spaced bank are staggered relative to recesses in said second bank.

36. The method according to claim 35, wherein said severing said cemented carbide body includes severing along a first line passing through said recesses in said first spaced bank, along a second line passing through said recesses in said second spaced bank, and along spaced parallel lines between said first and second lines.

* * * * *

UNITED STATES PATENT AND TRADEMARK OFFICE
CERTIFICATE OF CORRECTION

PATENT NO. : 6,182,533 B1
DATED : February 6, 2001
INVENTOR(S) : Klaus Tank

It is certified that error appears in the above-identified patent and that said Letters Patent is hereby corrected as shown below:

Column 4,
Line 49, delete "bank" and insert -- blank --.

Column 5,
Line 12, delete "10" and insert -- 9 --.
Lines 20 and 25, delete "13" and insert -- 12 --.
Line 27, delete "9" and insert -- 16 --.

Column 6,
Lines 1, 3, 6, 9, 16, 22 and 36, delete "20" and insert -- 19 --.
Line 33, delete "28" and insert -- 27 --.
Line 41, delete "31" and insert -- 30 --.
Line 44, delete "29" and insert -- 32 --.
Line 46, delete "31" and insert -- 30 --.
Line 48, delete "27" and insert -- 34 --.
Line 50, insert -- space -- between the words "second" and bank".

Signed and Sealed this

Twenty-third Day of April, 2002

Attest:

*Attesting Officer*

JAMES E. ROGAN
*Director of the United States Patent and Trademark Office*